(12) United States Patent
Meissner et al.

(10) Patent No.: US 7,210,701 B2
(45) Date of Patent: May 1, 2007

(54) AIRBAG SYSTEM

(75) Inventors: Dirk Meissner, Berlin (DE); Sami Al-Samarae, Berlin (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 11/181,676

(22) Filed: Jul. 14, 2005

(65) Prior Publication Data

US 2006/0006631 A1    Jan. 12, 2006

Related U.S. Application Data

(63) Continuation of application No. PCT/DE03/04214, filed on Dec. 17, 2003.

(30) Foreign Application Priority Data

Jan. 14, 2003   (DE) ............... 103 01 715

(51) Int. Cl.
*B60R 21/24*   (2006.01)
*B60R 21/16*   (2006.01)

(52) U.S. Cl. .................. 280/729; 280/731; 280/743.1

(58) Field of Classification Search ............... 280/731, 280/729, 743.1; *B60R 21/34, 21/24*
See application file for complete search history.

(56) References Cited

U.S. PATENT DOCUMENTS

| | | | |
|---|---|---|---|
| 5,529,337 A * | 6/1996 | Takeda et al. ............... 280/729 |
| 6,419,262 B1 | 7/2002 | Fendt et al. | |
| 6,431,586 B1 | 8/2002 | Eyrainer et al. | |
| 6,634,670 B1 | 10/2003 | Ellerbrok et al. | |

FOREIGN PATENT DOCUMENTS

| DE | 3833888 A1 * | 4/1990 |
|---|---|---|
| DE | 19628837 A1 * | 1/1997 |
| DE | 297 00 804 U1 * | 5/1997 |
| DE | 298 04 239 U1 | 3/1998 |
| DE | 199 32 696 C1 | 7/1999 |
| DE | 100 21 845 A1 | 5/2000 |
| DE | 100 21 893 A1 | 5/2000 |
| DE | 199 14 214 A1 * | 10/2000 |
| DE | 199 23 483 A1 * | 11/2000 |
| JP | 1-132444 A * | 5/1989 |
| JP | 11-227553 A * | 8/1999 |
| JP | 11-245759 A * | 9/1999 |
| JP | 2000 168486 | 6/2000 |
| JP | 2001-2778988 A * | 10/2001 |
| WO | WO 96/38324 | 5/1996 |
| WO | WO 00/03898 A1 * | 1/2000 |

OTHER PUBLICATIONS

PCT International Preliminary Examination Report dated Oct. 19, 2004 for International Application No. PCT/DE2003/004214 (3 pages).

* cited by examiner

*Primary Examiner*—Ruth Ilan
(74) *Attorney, Agent, or Firm*—Fitch, Even, Tabin & Flannery

(57) ABSTRACT

The invention relates to an airbag system for a motor vehicle, comprising at least one inflatable airbag for protecting passengers. The aim of the invention is to influence, in different ways, the direction of expansion and depth of an airbag, irrespective of the cut of the airbag and irrespective of the course of the stitches of the airbag. According to the invention, at least one supplementary airbag is associated with a main airbag. Said supplementary airbag has a lower volume in order to increase the depth of deployment and/or to alter the direction of deployment of the main airbag.

8 Claims, 5 Drawing Sheets

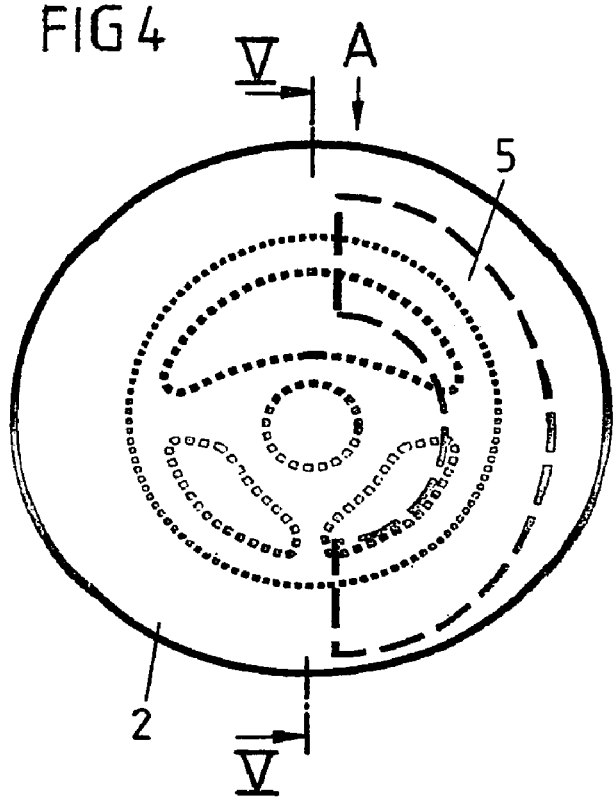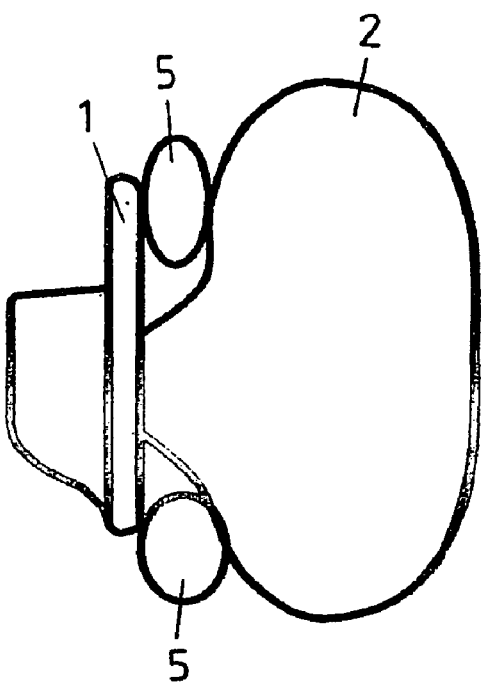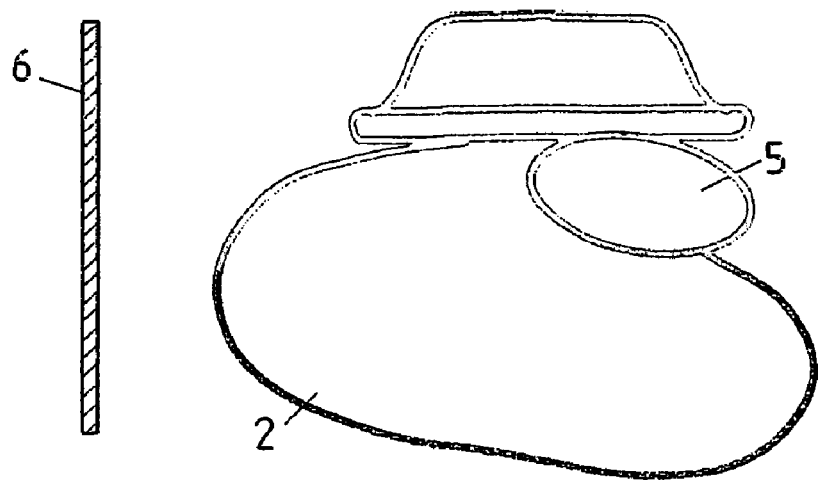

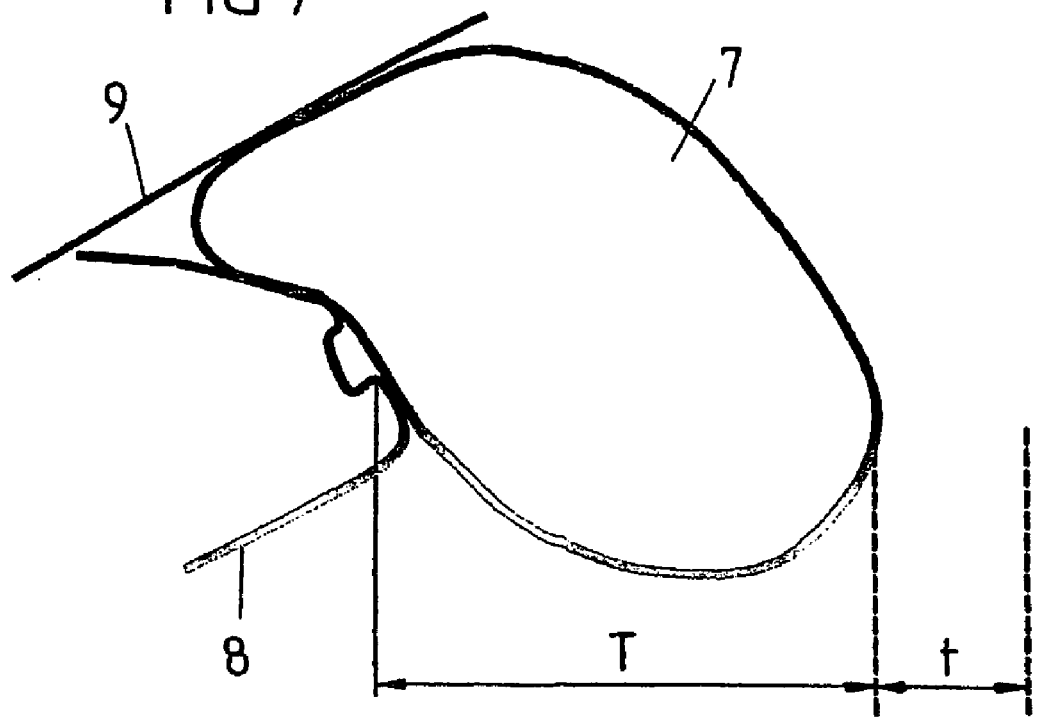
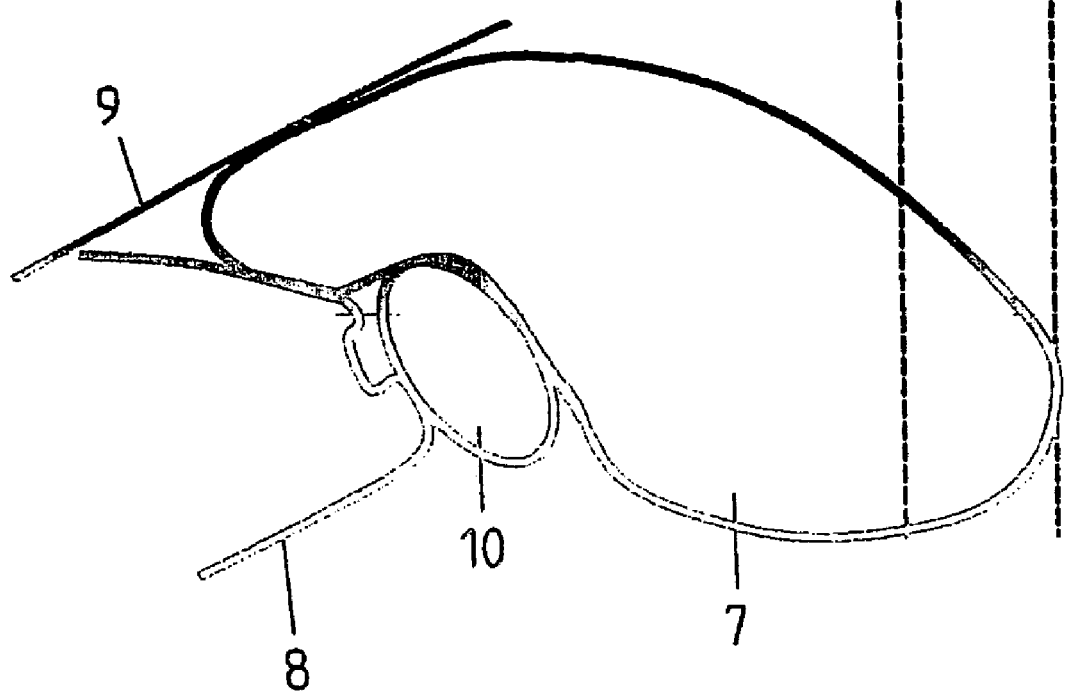

AIRBAG SYSTEM

CROSS REFERENCE TO RELATED APPLICATIONS

This is a continuation application of prior application number PCT/DE2003/004214, filed Dec. 17, 2003 and claims the benefit under 35 U.S.C. §119 of prior foreign application number DE 103 01 715.1, filed Jan. 14, 2003.

FIELD OF THE INVENTION

The invention relates to an airbag system for a motor vehicle.

BACKGROUND OF THE INVENTION

To achieve a defined deployment direction and deployment depth of airbags and consequently to achieve an improved protection function, it is known to achieve defined forms of an airbag in the inflated state by means of tension straps or to give airbags a form deviation from the circular or elliptic cross-sectional form. Thus, WO 96/38324 discloses an airbag module, in which the airbag has at least one region which has a narrowed cross section with respect to a wider region. Such an airbag can be inflated in a defined direction in a controlled manner without the arrangement of retaining straps, since it can be deployed in the regions of narrowed cross section to a lesser extent than in the remaining regions.

The disadvantage of this airbag is that, because of the special form, it is more costly than airbags that are of circular or elliptic blank form.

Furthermore, DE 298 04 239 discloses an airbag, in which regions of the wall are taken in by means of tearing seams. The tearing seams can be produced by means of threads of different strengths. As a result, the volume and consequently the hardness of the airbag can be set individually according to the load, that is to say the airbag can be adapted to occupants of different weight and to different gas generator power.

The disadvantage of this arrangement is that additional stitching work on the airbag is required and that its deployment direction and deployment depth cannot be influenced.

SUMMARY OF THE INVENTION

The object on which the invention is based is to achieve a differing influence on the propagation direction and propagation depth of an airbag, irrespective of the blank form of the airbag and irrespective of the course of the seams of the airbag.

This is achieved, according to the invention, by means of the features described hereinafter.

In an airbag system for a motor vehicle with at least one inflatable airbag for occupant protection, according to the invention a main airbag is assigned at least one additional inflatable airbag of lower volume in order to increase the deployment depth and/or to vary the deployment direction of the main airbag.

The smaller additional airbag, after its deployment, presses onto the main airbag at a predetermined point, so that the latter is deployed, as a function of the accident situation, in a direction other than would be the case without an additional airbag. Moreover, a greater deployment depth is achieved than corresponds to its geometric form, in that the additional airbag displaces the main airbag in the direction of the occupant. The increased airbag depth brings about early restraint and consequently a reduction in the load values. It is thereby possible to give the main airbag a simple geometric form, for example a circular or elliptic form, so that it can be produced in a simple way. The standard airbag system, such as is customary in motor vehicles, can thus be preserved.

It is expedient that at least one additional airbag is assigned a separate gas generator or, if multistage gas generators are used, a proportionate ignition stage of the gas generator. By means of suitable sensor technology, an accident situation actually taking place is detected, so that, as function of the type of crash, for example a frontal, oblique or lateral crash, different additional airbags are deployed, and, consequently, a deployment direction and deployment depth of the respective main airbag which ensure the best protection of the occupant are consequently achieved.

In one form of use, at least one additional airbag is arranged on the steering wheel in such a way that, in the inflated state, it lies between the steering wheel and the driver's airbag designed as the main airbag. It is expedient, in this form of use, to provide an annular additional airbag or two semiannular additional airbags. It is also possible, however, according to the highest probability of an offset or oblique collision, to provide a semiannular additional airbag on that side of the steering wheel which faces away from the driver's door. An offset collision is a frontal collision in which the motor vehicle crashes with only part of its front side against an obstacle.

In a further form of use, at least one additional airbag is arranged on the front-seat passenger's side on the instrument panel in such a way that, in the inflated state, it lies between the instrument panel and the front-seat passenger's airbag designed as the main airbag. In one embodiment, the additional airbag is arranged in such a way that, in the inflated state, it lies in the front side of the instrument panel. In a further embodiment, the additional airbag is arranged in such a way that, in the inflated state, it lies between the instrument panel and the windshield. It is expedient that, in this form of use, the additional airbags, in the inflated state, are in the form of an ellipsoid or cylinder preferably arranged horizontally.

In a further form of use, at least one additional airbag is arranged laterally with respect to an occupant in such a way that, in the inflated state, it lies between a door or side wall of the motor vehicle and a main airbag designed as a side airbag.

Since it is customary nowadays for motor vehicles to have driver's, front-seat passenger's and side airbags as a complex system, it is expedient that each of these forms of use of the airbag is assigned at least one additional airbag according to the invention, that is to say that a complex system of additional airbags is also present.

A gas generator or a proportionate ignition stage of a multistage generator for the additional airbag may both be ignitable simultaneously with a gas generator for the main airbag and be ignitable with a time offset in relation to the gas generator for the main airbag. The time-offset ignition may take place both before and after the ignition of the gas generator for the main airbag.

The volume of the additional airbag preferably amounts to 5–30 percent of the volume of the main airbag.

BRIEF DESCRIPTION OF THE DRAWINGS

The invention will be explained in exemplary embodiments, with reference to drawings in which:

FIG. 4 shows a top view of a second embodiment of a driver's airbag system according to the invention;

FIG. 5 shows a section through the driver's airbag system along the sectional line V—V of FIG. 4;

FIG. 6 shows a side view A according to FIG. 4.

FIG. 7 shows a section through a conventional front-seat passenger's airbag system.

FIG. 8 shows a section through a first embodiment with a front-seat passenger's airbag system according to the invention;

DETAILED DESCRIPTION OF THE PREFERRED EMBODIMENTS

Figure 1:
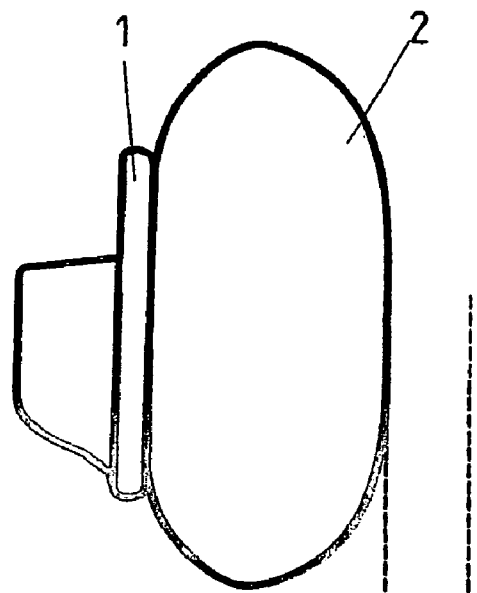
FIG. 1 shows a section through a conventional driver's airbag system.

FIG. 1 illustrates diagrammatically a steering wheel 1 and a deployed driver's airbag 2 of conventional type. This airbag is produced from circular blanks, and it is clear that, after deployment, it lies on the steering wheel and extends as far as the deployment depth T in the direction of the occupant, not illustrated.

Figure 3:
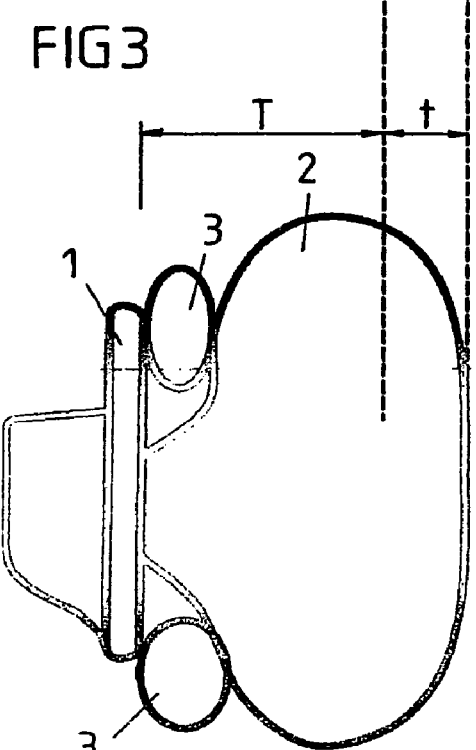
FIG. 3 shows a section through the driver's airbag system along the section line III—III of FIG. 2
Figure 2:
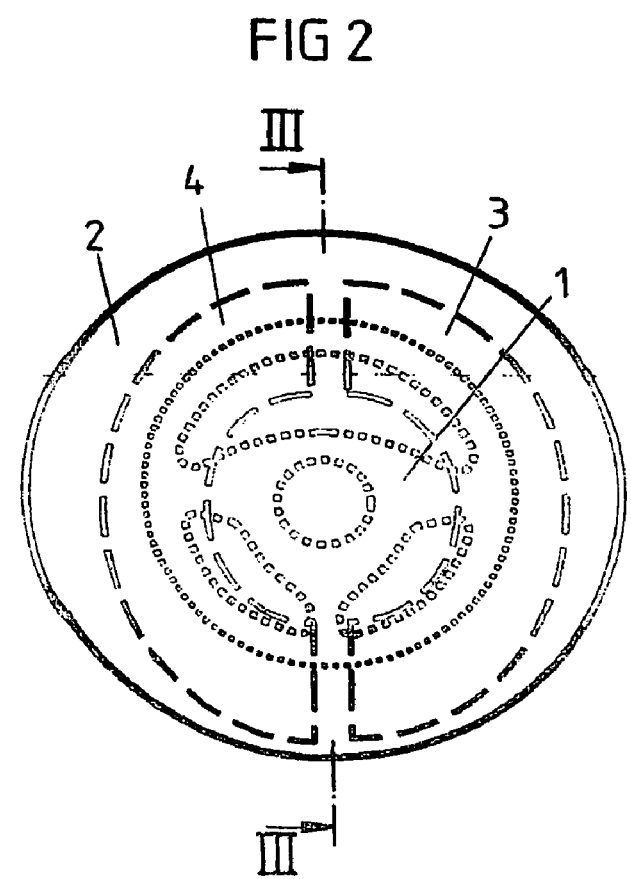
FIG. 2 shows a top view of a first embodiment of a driver's airbag system according to the invention

In the first embodiment of a driver's airbag system according to the invention, as illustrated in FIGS. 2 and 3, two semicircular additional airbags 3, 4 are arranged, which are provided on the left and right side of the steering wheel aligned for travel straight ahead. It is evident from FIG. 3, which illustrates a deployed airbag, how these additional airbags deform the driver's airbag 2 arranged as the main airbag. Owing to the pressure of the deployed additional airbags 3, 4 on the driver's airbag 2, the deployment depth of the latter in the direction of the occupant is increased by the value t. In the case illustrated in which both additional airbags are deployed, the deployment direction of the driver's airbag 2 is influenced only insignificantly. Only the off-center position of the additional airbags with respect to the driver's airbag (FIG. 2) slightly influences the deployment direction of the driver's airbag.

In the embodiment of FIGS. 4–6 in which the deployed airbags are likewise illustrated, a semicircular additional airbag 5 is provided on that side of the steering wheel 1 which faces away from the driver's door 6. As can be seen from the view of FIG. 6, in this case not only the deployment depth of the driver's airbag is influenced, but also its deployment direction. As is evident from FIG. 6, the driver's airbag has a greater deployment depth on the side facing the front-seat passenger than on the side facing the driver's door. This arrangement for the illustrated one-sided increase in the deployment depth improves the protection of the occupant in the event that an offset collision occurs on the left front side of the motor vehicle. In this case, with regard to an airbag having a constant deployment depth, there is the risk that the driver slips off from the deployed airbag on the right and bumps against the instrument panel. On account of the illustrated one-sided increase in the deployment depth in the airbag system according to the invention, there is no longer this risk or it is at least greatly reduced.

The same action can also be achieved by means of the airbag system illustrated in FIGS. 2 and 3 if, in the event of the abovementioned crash, only the additional airbag 3 is deployed.

FIG. 7 illustrates a front-seat passenger's airbag system of conventional type of construction with a deployed front-seat passenger's airbag 7. This is deployed, on the one hand, between the instrument panel 8 and the windshield 9 of the motor vehicle, and, on the other hand, in the direction of the occupant, not illustrated. A deployment depth T is achieved in this direction.

FIG. 8 illustrates a front-seat passenger's airbag system according to the invention, in which an additional airbag 10 is provided on the front side of the instrument panel 8. It is evident that, in this arrangement, the deployment of the airbag between the instrument panel 8 and the windshield 9 does not vary. By contrast, the propagation direction and propagation depth in the direction of the occupant changes. The front-seat passenger's airbag 7 is not deployed as far downward as in FIG. 7. By contrast, the propagation depth is increased by the amount t.

Figure 9:
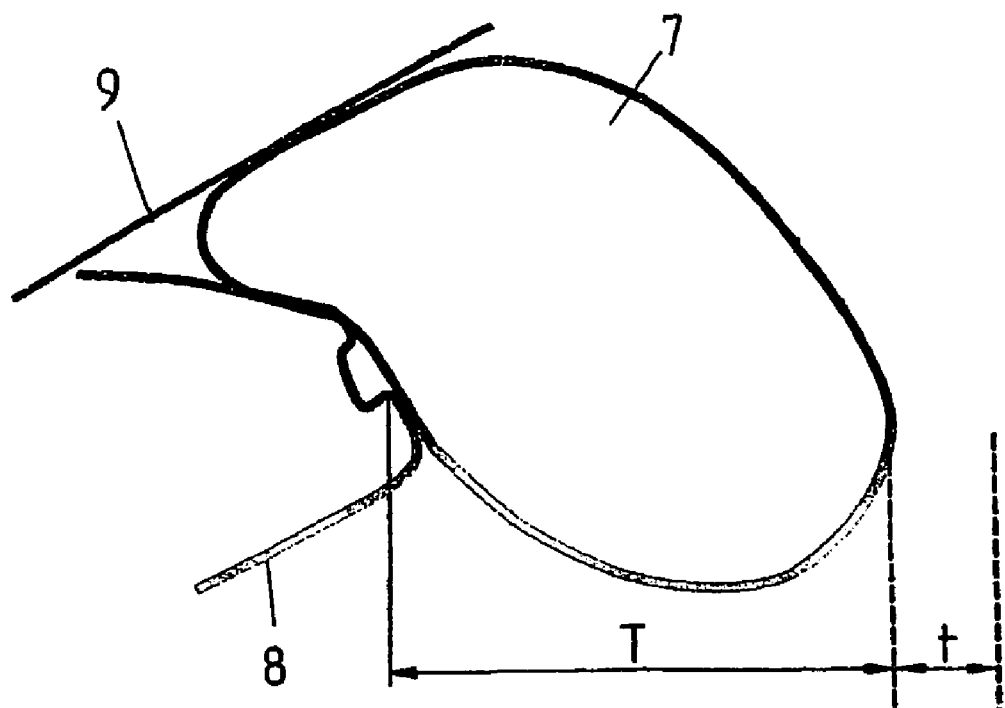
FIG. 9 shows a section through a conventional front-seat passenger's airbag system.
Figure 10:
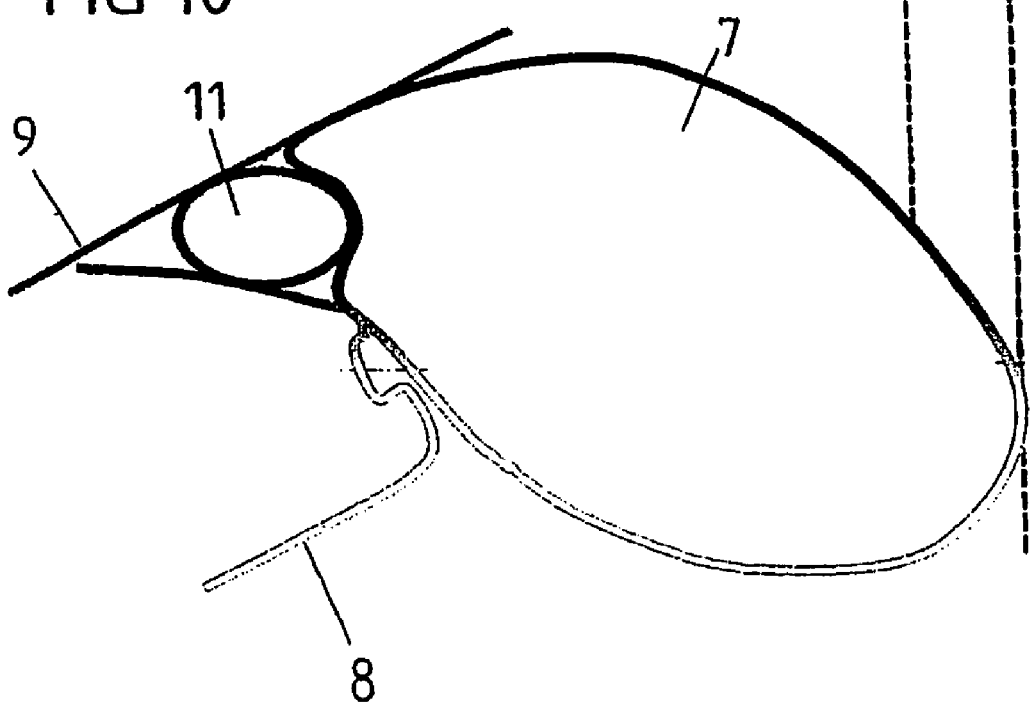
FIG. 10 shows a section through a second embodiment of a front-seat passenger's airbag system according to the invention.

In the front-seat passenger's airbag system according to the invention shown in FIG. 10, an additional airbag 11 is provided between the instrument panel 8 and the windshield 9. In this embodiment, too, the deployment direction and deployment depth change as a result of the influence of the additional airbag 11. In this case, too, the front-seat passenger's airbag is not deployed as far downward as in the conventional system illustrated in FIG. 9, whereas the deployment depth is increased by the amount t.

The additional airbags 10 and 11, which are illustrated only in cross section in FIGS. 8 and 10, in this exemplary embodiment are in the form of a horizontal ellipsoid or cylinder.

Figure 11:
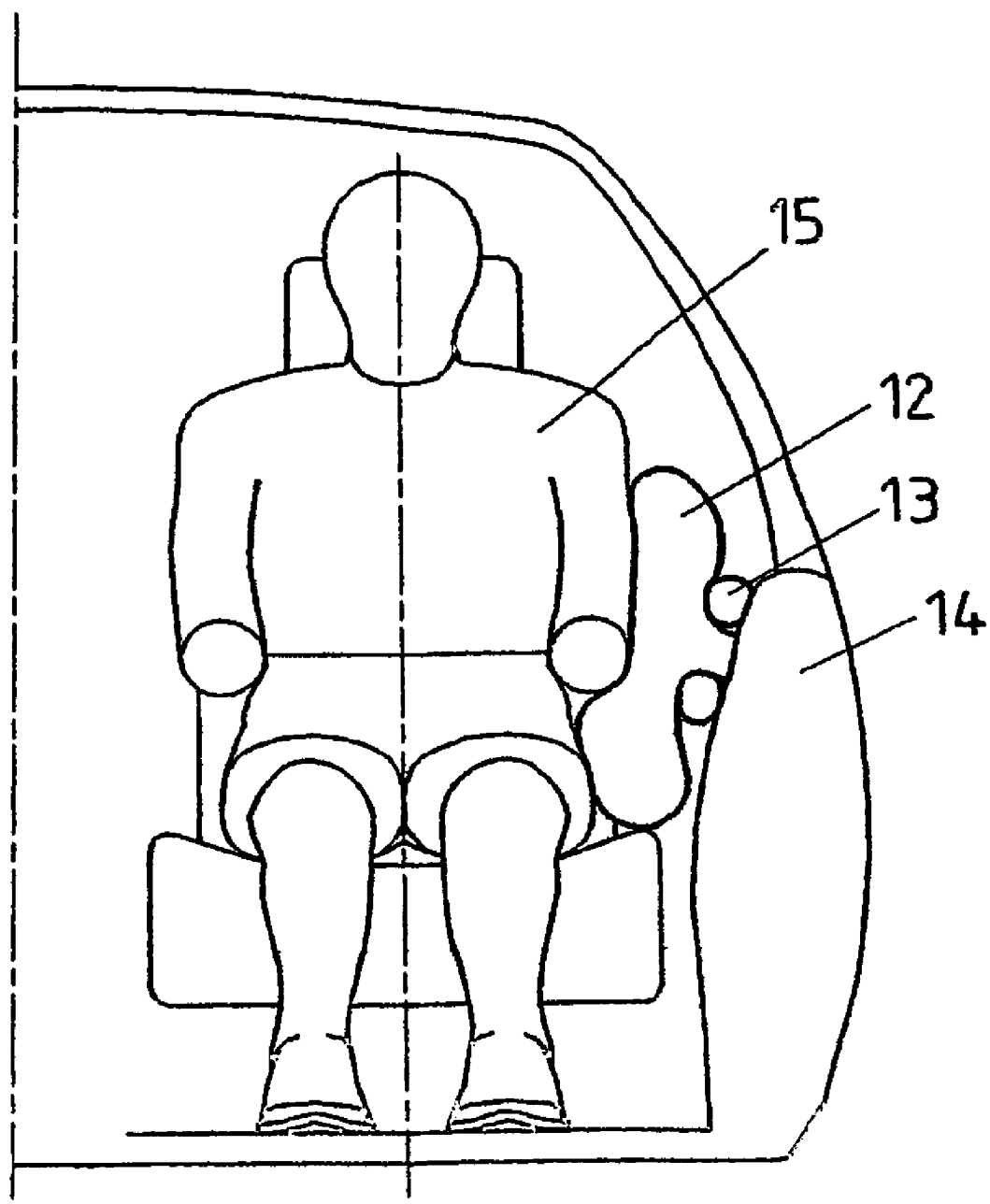
FIG. 11 shows a section through a side airbag system according to the invention.

FIG. 11 illustrates a side airbag system according to the invention. The side airbag 12, as the main airbag, is assigned an additional airbag 13. Both airbags are deployed out of a vehicle door 14. In this case, too, the deployment depth of the side airbag 12 in the direction of an occupant 15 is increased.

What is claimed is:

1. An airbag system for a motor vehicle having a steering wheel with a reference axis extending centrally through the steering wheel to divide the steering wheel into left and right hand lateral sides and at least one inflatable airbag for occupant protection, the airbag system comprising a main airbag assigned at least one additional airbag of lower volume in order to increase the deployment depth and/or to vary the deployment direction of the main airbag, with the at least one additional airbag being arranged on the steering wheel in such a way that, in the inflated state, it lies between the steering wheel and the driver's airbag designed as the main airbag, the additional airbag having a semiannular configuration and being disposed on one of the lateral sides of the steering wheel.

2. The airbag system as claimed in claim 1, wherein the at least one additional airbag is assigned a separate gas generator with a sensor for triggering the ignition of the gas generator in the event of a crash.

3. The airbag system as claimed in claim 1, including a multistage gas generator and wherein the at least one additional airbag is assigned a proportionate ignition stage of the gas generator.

4. The airbag system as claimed in claim 1, wherein the additional airbag comprises two semiannular additional airbags with one of the semiannular airbags disposed on one of the lateral sides and the other semiannular airbag disposed on the other lateral side of the steering wheel.

5. The airbag system as claimed in claim 1, including a gas generator or a proportionate ignition stage of a multi-stage generator for the additional airbag that can be ignited simultaneously with a gas generator for the main airbag.

6. The airbag system as claimed in claim 1, including a gas generator or a proportionate ignition stage of a multi-stage generator of the additional airbag that can be ignited with a time offset in relation to a gas generator for the main airbag.

7. The airbag system as claimed in claim 1, wherein the volume of the additional airbag is 5–30 percent of the volume of the main airbag.

8. An airbag system for a motor vehicle having a steering wheel with at least one inflatable airbag for occupant protection, the airbag system comprising a main airbag assigned at least one additional airbag of lower volume in order to increase the deployment depth and/or to vary the deployment direction of the main airbag, with at least one additional airbag being arranged on the steering wheel in such a way that, in the inflated state, it lies between the steering wheel and the driver's airbag designed as the main airbag, wherein the additional airbag is semiannular and provided on that side of the steering wheel which faces away from the driver's door.

* * * * *